(12) United States Patent
Gaarder

(10) Patent No.: US 8,910,530 B2
(45) Date of Patent: Dec. 16, 2014

(54) METHOD AND APPARATUS FOR THE MEASUREMENT OF FLOW IN GAS OR OIL PIPES

(75) Inventor: Pål Even Gaarder, Oslo (NO)

(73) Assignee: Thomson Reuters (Markets) Norge AS, Oslo (NO)

( * ) Notice: Subject to any disclaimer, the term of this patent is extended or adjusted under 35 U.S.C. 154(b) by 132 days.

(21) Appl. No.: 13/466,666

(22) Filed: May 8, 2012

(65) Prior Publication Data

US 2012/0279316 A1 Nov. 8, 2012

Related U.S. Application Data

(63) Continuation-in-part of application No. PCT/EP2010/067281, filed on Nov. 11, 2010.

(30) Foreign Application Priority Data

Nov. 11, 2009 (GB) .................................... 0919709

(51) Int. Cl.
*G01F 1/708* (2006.01)
*G01F 1/68* (2006.01)
*G01F 1/688* (2006.01)
*G01F 1/684* (2006.01)

(52) U.S. Cl.
CPC ............... *G01F 1/68* (2013.01); *G01F 1/6884* (2013.01); *G01F 1/6847* (2013.01)
USPC .......................................... 73/861.95; 73/861

(58) Field of Classification Search
USPC ....................................................... 73/861.95
See application file for complete search history.

(56) References Cited

U.S. PATENT DOCUMENTS

| 6,354,147 | B1 | 3/2002 | Gysling |
| 7,752,909 | B2 | 7/2010 | Kamiunten et al. |
| 8,360,635 | B2 * | 1/2013 | Huang et al. ................. 374/147 |
| 2002/0194932 | A1 | 12/2002 | Gysling |
| 2003/0010126 | A1 | 1/2003 | Romanet |
| 2003/0038231 | A1 | 2/2003 | Bryant |
| 2004/0226386 | A1 | 11/2004 | Gysling |
| 2008/0210002 | A1 * | 9/2008 | Kamiunten et al. ........ 73/204.23 |

FOREIGN PATENT DOCUMENTS

| GB | 1246670 A1 * | 9/1971 |
| WO | 2005015135 | 2/2005 |

* cited by examiner

*Primary Examiner* — Lisa Caputo
*Assistant Examiner* — Jamel Williams
(74) *Attorney, Agent, or Firm* — 24IP Law Group; Timothy R DeWitt

(57) ABSTRACT

The present disclosure relates to a method and an apparatus for measuring a flow rate through a conduit, such as a pipeline. The method comprises providing a reference parameter, measuring a first parameter at a first position at the conduit and determining a difference between the first parameter and the reference parameter. The flow rate through the conduit is determined based on the difference between the first parameter and the reference parameter.

14 Claims, 4 Drawing Sheets

METHOD AND APPARATUS FOR THE MEASUREMENT OF FLOW IN GAS OR OIL PIPES

CROSS REFERENCE TO OTHER APPLICATIONS

This application is a continuation-in-part of International Patent Application No. PCT/EP2010/067281 filed on 11 Nov. 2010 and claims priority to and benefit of GB Patent Application No. 0919709 filed on 11 Nov. 2009, the entire contents of each of which are incorporated herein by reference.

FIELD OF THE INVENTION

The field of the present invention relates to a method and an apparatus for measuring a flow rate of a fluid, such as the flow rate of a fluid through pipelines or similar conduits. In particular, the present disclosure relates to a method and an apparatus for measuring a flow rate of a fluid in a conduit without having direct access to the conduit.

BACKGROUND OF THE INVENTION

Pipelines for transporting fluids such as gas, oil or other combustible liquids are widely used. Trade and transport of combustible fluids is an economically important market with a large number of participants on the market. The amount of the combustible fluids being transported through the pipelines is therefore a valuable parameter for statistics and other economic parameters. Data on how much of the fluid is transported through the pipelines can traditionally only be measured by companies having direct access to the inside of the pipelines. The companies having such access often do not share or provide this data to third parties or to the public.

Therefore methods and systems have been developed to measure the volumetric flow or flow rates in pipelines from the outside without having direct access to the inside of the pipelines or without having physical contact with the pipelines.

Documents WO 2005/042984 and WO 2008/030844 teach the use of acoustic sound transducers for producing and measuring acoustic signals emanating from the pipeline. The acoustic signals emanating from the pipeline often comprise a number of acoustic signals from different sources that are not always easy to separate from one another. The acoustic signals of interest have to be carefully filtered which involve advanced filtering techniques and a large amount of computing power. The acoustic signals will also be influenced and changed by changes in the environments.

U.S. Pat. No. 5,571,974 discloses a system for measuring the flow of coal particles in a flow string by measuring the vibration of a tube through which the coal particles flow. This method is not applicable for liquids that do not contain any particles.

German Patent DE 198 58 307 teaches an apparatus and a method for measuring the flow through a pipeline wherein a heat flow sensor is attached to the pipeline.

U.S. Pat. No. 4,984,460 describes a heat flow meter with two heat sensitive coils that wound around a conduit.

U.S. Pat. No. 6,883,369 B1 describes a heat flow sensor wherein a heat probe and a reference sensor are in direct contact with a tube.

U.S. Pat. No. 4,255,968 describes a method and an apparatus for measuring a flow through a tube by heating the tube and measuring a temperature difference directly on the tube.

It is an object to the present invention to provide a method and an apparatus for measuring a flow rate of a fluid in a conduit without having direct access to the conduit.

SUMMARY OF THE INVENTION

The present disclosure relates to a method for measuring a flow rate through a conduit. The method comprises providing a reference parameter, measuring a first parameter at a first position at the conduit, determining a difference between the first parameter and the reference parameter and determining the flow rate through the conduit based on the determined difference. The reference parameter and the first parameter could be either a dimension of the conduit or the reference parameter and the first parameter are a temperature.

The method may use temperature sensors for measuring the flow rate which are easy to use and commercially available. The method can be used without access to the inside of the conduit and at any suitable place at the conduit.

The conduit may be a pipeline for transporting fluids, such as combustible fluids like gas or oil. The fluid may be a compressible liquid or mixtures of gasses and liquids, solid grain materiel such as coal or carbon particles.

The measured flow rate may be the flow rate of a fluid or a gas flowing through the conduit. The flow rate may be the volumetric flow rate, and may be determined in volume/time.

The first position of the first sensor may be a defined place at the conduit.

The first sensor may be a temperature sensor and the first a parameter is a first temperature.

The temperature sensor may be in direct contact with the conduit and may measure the temperature at the outside surface of the conduit. The temperature sensor may also be arranged at some distance from the conduit. The temperature sensor may be infrared (IR) radiation sensor for measuring the temperature of the conduit without direct contact to the conduit.

If the first parameter is a first temperature, the first position of the first sensor may be at a place where the fluid in the conduit exchanges heat with the environment of the conduit. Heat exchange with the environment will, for example occur when the conduit exits a medium such as the earth or sea. If the sea or earth has a lower temperature than the environment of the conduit after exiting the sea or earth, the conduit may be cooled by the fluid and a temperature lower than the temperature of the environment will be measured at the conduit. The temperature of the environment may be used as the reference temperature The first position of the first sensor may be also be at a place where the fluid inside the conduit changes pressure, for example at a pump, a valve, a choke or a bend. The change in pressure of the fluid changes the temperature of the fluid, for example by the Van der Waals equation or similar equations. The change in temperature of the fluid may result in a temperature difference at the conduit in front of and behind the pressure change.

Providing the reference temperature may comprise measuring the reference temperature. The reference temperature can be measured at a known or a measured distance from the first position.

The reference temperature may be a temperature of the environment of the conduit, fur example the air surrounding the conduit.

The reference temperature may be a water temperature and the method may comprise measuring the water temperature as the reference temperature.

The reference temperature may be a ground or soil temperature and the method may comprise measuring the ground or soil temperature as the reference temperature.

The reference temperature may also be known from other sources, such as meteorological data sources.

The present disclosure also relates to an apparatus for measuring a flow rate through a conduit. The apparatus comprises a first temperature sensor for measuring a first temperature in the proximity of the conduit and a calculation unit for determining a temperature difference between the first temperature and a reference temperature for determining the flow rate through the conduit based on the temperature difference.

The apparatus may further comprise a reference temperature sensor for measuring the reference temperature.

DETAILED DESCRIPTION

The invention will now be described on the basis of the drawings. It will be understood that the embodiments and aspects of the invention described herein are only examples and do not limit the protective scope of the claims in any way. The invention is defined by the claims and their equivalents. It will also be understood that a feature of one aspect can be combined with the features of another aspect or other aspects.

The present invention is based on the observation that a tubing or pipe collectively called a conduit conducting a hot fluid will be warmed up as long as the fluid flows through the tubing. If the flow is stopped the temperature of the conduit will decrease to the temperature of the environment of the conduit. A simple example of such a conduit is the household water pipe.

The present disclosure uses this observation for measuring the following parameters related to a flow rate of the liquid in the tubing, pipe or other type of conduit:
a) If the temperature of the conduit is higher than the temperature of the environment, a hot fluid is flowing through the conduit.
b) If the temperature of the conduit increases, there is an increasing flow of hot fluid and the flow rate is increased.
c) If the temperature of the conduit is stable at a higher temperature than the environment over a time interval, there is a stable flow of hot fluid at a constant flow rate through the conduit.
d) If the temperature of the conduit decreases from a higher temperature towards the temperature of the environment, the flow rate of the hot fluid has been decreased or stopped.

The same principle may be applied inversely if the fluid in the conduit is colder than the environment.

While the examples given above assume that the temperature differences between the fluid in the conduit and the environment are rather high, it has been found that the same principle can be applied if the temperature differences are small. For example, the temperature differences may be 1° C. or less.

The flow rate in the conduit may be calculated in a first approximation by the equation:

$$\text{Flow} = (T_c - T_r) * k \quad (1)$$

Where Flow is the flow through the conduit in volume per time, $T_c$ is the temperature measured from the conduit, $T_r$ is a reference temperature and k is a constant. More advanced formulas can be applied using adding offsets, a variable heat capacitance of the fluid, a heat capacity of the conduit.

Figure 1:
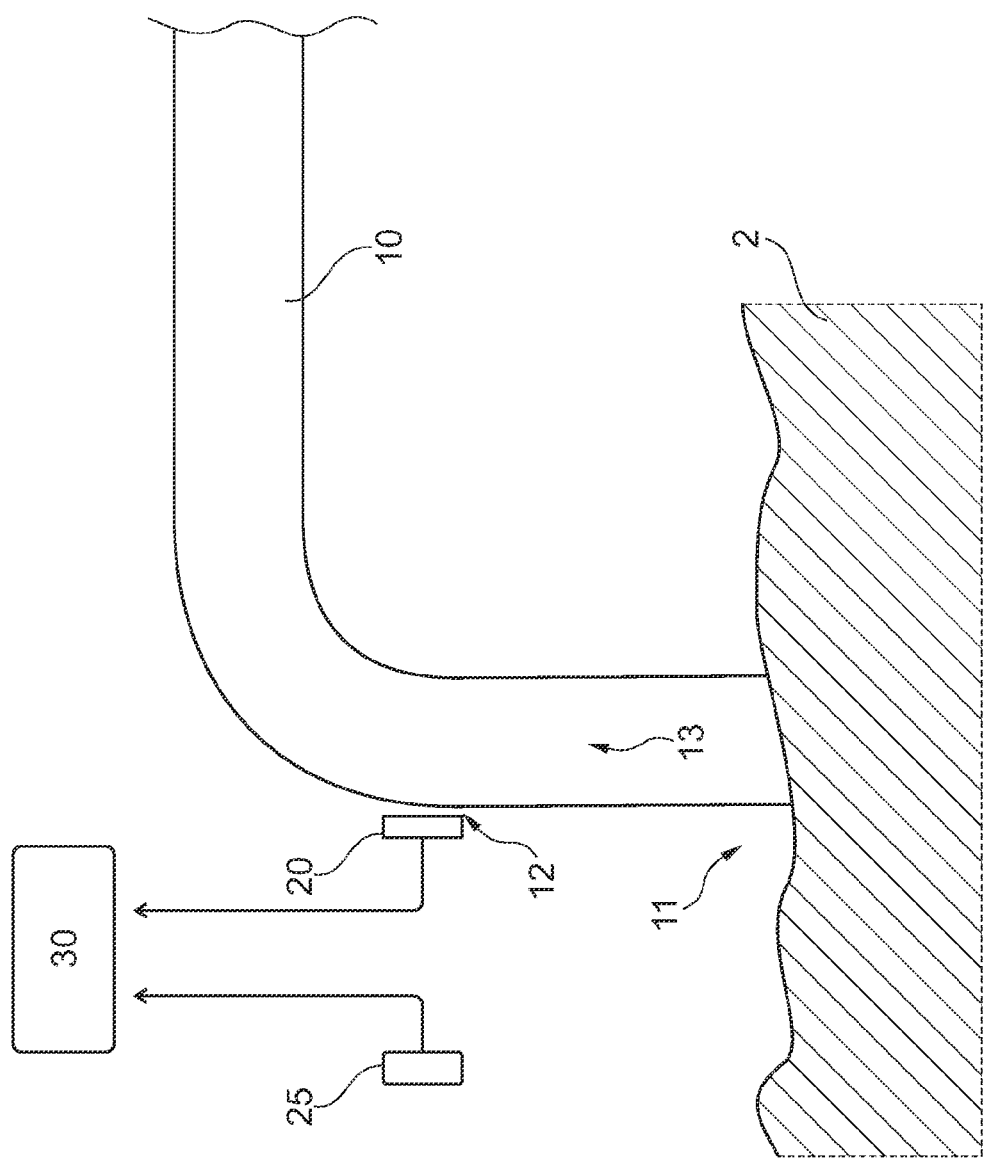
FIG. 1 shows a first aspect for measuring the flow rate through a conduit.

FIG. 1 shows an example of how a flow rate of fluid in a conduit is measured in one aspect of this invention. The conduit may be a pipeline used for transporting fluids 13 such as gas or oil. The term fluid used in this disclosure also comprises compressible liquids or mixtures of gasses and liquids and solid grain materiel. FIG. 1 shows a pipeline 10 exiting from the sea 2. Such an exit point 11 can be found, for example, where the pipeline 10 crosses out from the sea 2 at the coast. Alternatively, the pipeline 10 may exit at the exit point 11 from the ground or soil. The method and the apparatus of the present disclosure can be used at such exit points 11 because the pipelines 10 are easily accessible. The pipeline 10 and the fluid 13 flowing through the pipeline 10 are at a constant temperature at the exit point 11 from the sea 2 or from the ground. This constant temperature corresponds to the temperature of the sea 2 or of the ground. The ground temperature or a sea temperature can be easily may be used for the determination of the flow rate but it is not necessary for the present invention to measure or know this ground or sea temperature.

A first temperature sensor 20 may be arranged at a first position 12 of the pipeline 10 and the temperature of the pipeline at the first position 12 can be measured as a first temperature $T_c$. The first temperature sensor 20 may be in direct contact with the pipeline 10, as shown in FIG. 1. No access to the inside of the pipeline 10 is necessary and the first temperature sensor 20 may be removable attached to the pipeline 10. For example the first temperature sensor 20 may be attached to the pipeline 10 using a magnet, a tape or other means for fixing the temperature sensor 20 to the pipeline 10. The temperature sensor 20 may be removably arranged at the pipeline 10 or may be fixedly installed.

The first temperature sensor 20 may be a commercially available temperature sensor. The first temperature sensor 20 may have an accuracy of about 1% depending of the site and number of sensors.

The first temperature sensor 20 may transmit the measured parameter (in this case temperature data) to a calculation unit 30. A simple wire connection or a radio connection may be used to transmit temperature data measured by the first temperature sensor 20 to the calculation unit 30. The calculation unit 30 can be a handheld device for in-field measurements. The calculation unit 30 can also be arranged at some distance from the temperature sensor 20 and the temperature data can be transmitted via a radio connection, the internet or other known means for data transfer. The calculation unit 30 may be a separate device or may be implemented in a computer program running on a commercially available computer close to the site or far remote from the site. The calculation unit 30 determines the difference between the first temperature $T_c$ at the first position 12 of the pipeline 10 and the reference temperature $T_R$ as outlined above (equation 1).

The reference temperature $T_R$ may be obtained from a reference temperature sensor 25. The reference temperature sensor 25 may measure the temperature of the environment, for example the air surrounding the pipeline 10. The temperature measured at the reference temperature sensor 25 may be equal to or may be used to derive the reference temperature $T_R$ corresponding to the temperature at the first position 12, if no fluid flow is present in the pipeline 12.

The calculation unit 30 may in some applications receive further temperature information from further temperature sensors arranged at different positions at or along the pipeline 10 or elsewhere. If several different ones of the temperature sensors are used, the measurement accuracy may be improved.

In some applications, the reference temperature sensor may be omitted and the reference temperature $T_R$ may be determined or known from other sources.

In one example, the reference temperature $T_R$ can also be measured using the first temperature sensor 20. In this case, the reference temperature $T_R$ can be measured at a reference time tr, for example when there is no flow in the pipeline 12, but the invention is not limited thereto. The first temperature $T_1$ can then be measured at time t1, which is at a different time than tr, also using the first temperature sensor 20. Only one temperature sensor is required in this aspect of the disclosure.

Figure 2:
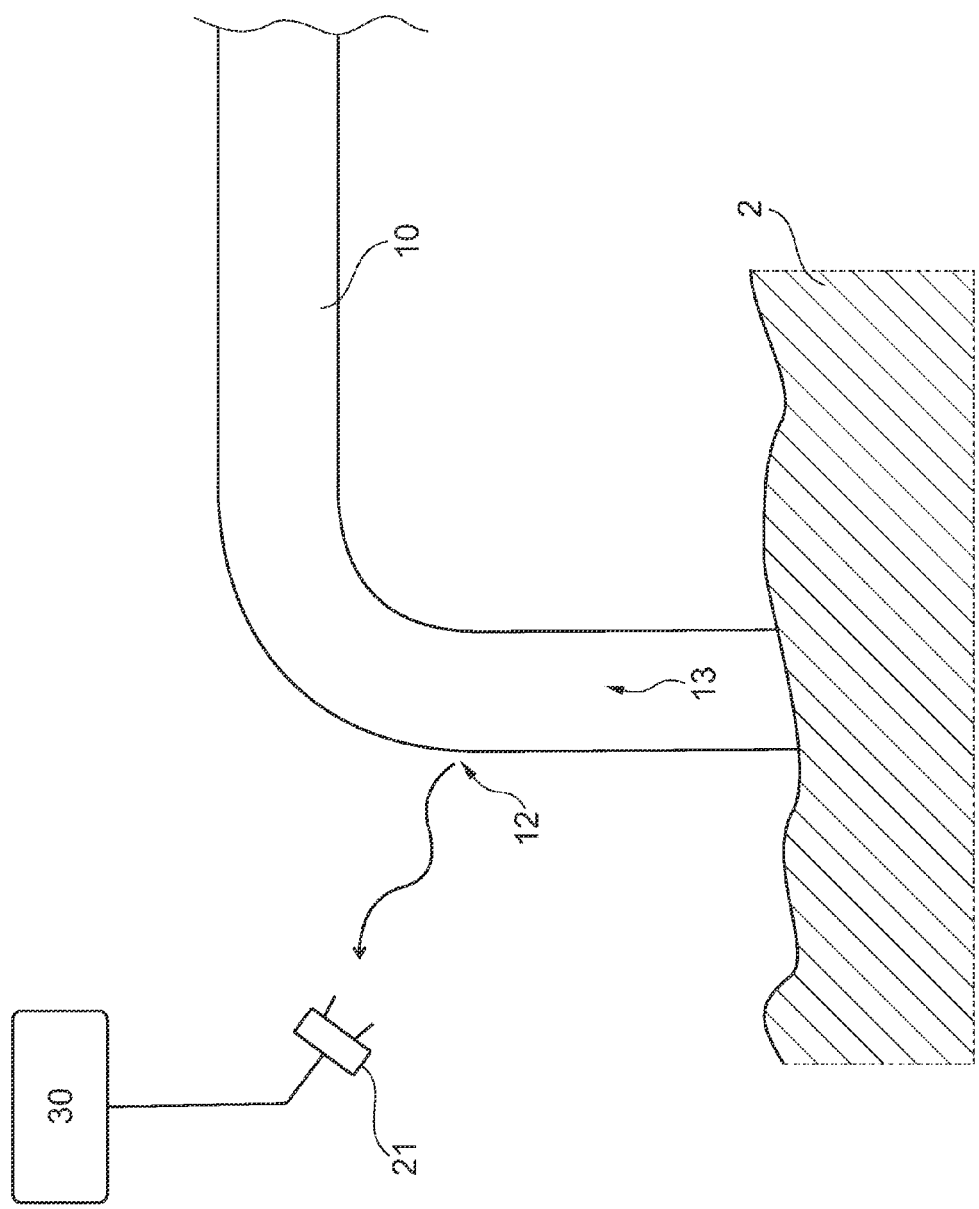
FIG. 2 shows a second aspect for measuring the flow rate through a conduit.

An additional aspect is shown in FIG. 2. The example of FIG. 2 is identical to the example shown in and described with respect to FIG. 1 and the same measurement principles may be applied. The examples of FIG. 2 and FIG. 1 differ in that FIG. 2 uses a radiation sensor 21 to measure the first temperature $T_1$ at the first position 12. Using the radiation sensor 21, such as an infrared (IR) radiation sensor, has the advantage that the first temperature $T_1$ can be measured at a distance from the first position 12 and that no direct access to the pipeline 10 is necessary. This makes it possible to determine the flow rate of the fluid 13 inside the pipeline 10 without having direct access to the pipeline 10.

The aspect of FIG. 2 further differs from FIG. 1 *f* in that the reference temperature sensor 25 is omitted as explained above. It is obvious that the example of FIG. 2 can be used with a reference sensor 25.

Figure 3:
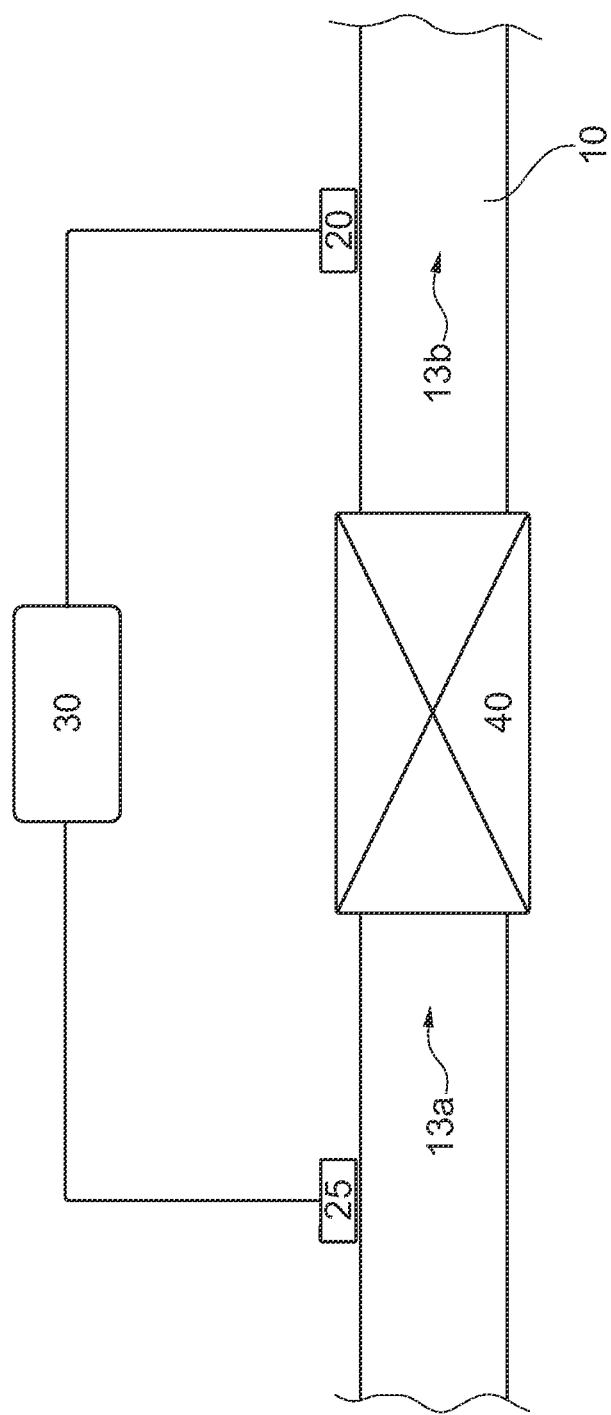
FIG. 3 shows a third aspect for measuring the flow rate through a conduit.
Figure 4:
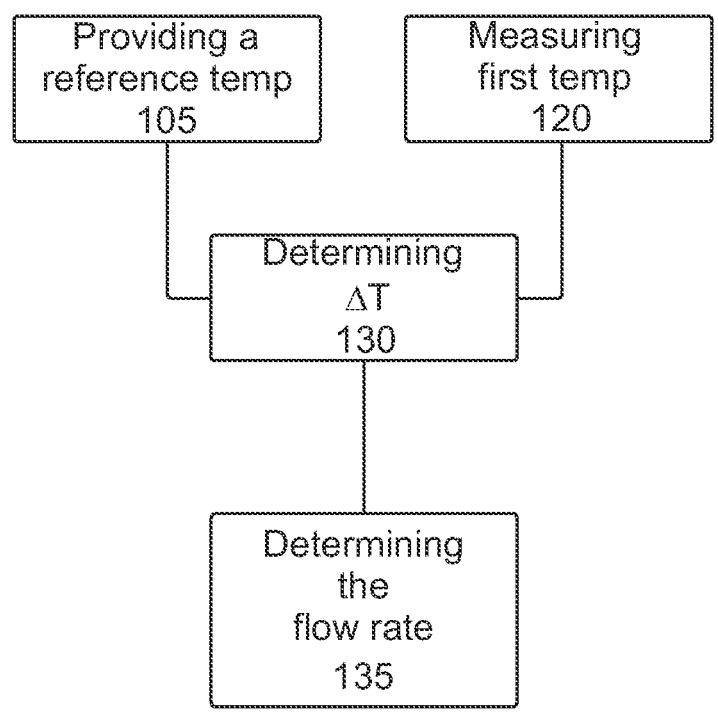
FIG. 4 shows a flow diagram of the method of the present disclosure.

FIG. 3 shows a further aspect of the present invention. If there is a compressible fluid inside the conduit 10, the temperature will also change if there is a change of pressure inside the conduit 10. This temperature difference may be measured and the flow rate of the fluid may be derived. A change or pressure in the pipeline 10 may be changed by an element 40 in the pipeline. The element 40 may be a pump, a valve, a bend, a choke, or just a heating element which is turned on.

If, for example, a valve 40 is present is used, the compressible fluid may be expanded and the compressible fluid 13*b* behind the valve may have a lower temperature compared to the temperature of the compressible fluid 13*a* in front of the valve 40. The temperature of the compressible fluid 13*b* behind the valve 40 may be measured with the first temperature sensor 20 and may be compared to the temperature of the compressible fluid 13*a* in front of the valve 40 measured by reference temperature sensor 25.

The example shown in FIG. 3 can also be used to determine pressure differences in the pipeline 10, if the flow rate is known. From the pressure difference further parameters of the element 40 such as the setting of the valve or the pumping level of a pump.

While the examples given above have been described by comparing a first temperature with a reference temperature, the present disclosure is not limited thereto. As noted previously, a plurality of temperature measurements can be made at different places along the conduit or pipeline 10.

It is also possible to set up more advanced and accurate measurements of the flow and to determine several unknown parameters, example the mass flow/time, the volume flow/time, the pressure inside the conduit, the heat capacity of the fluid inside the conduit, the volume mixture of the material inside the conduit, the mass mixture of the material inside the conduit, either static or change per time.

While the aspects given above have been described by measuring the temperatures at one or two points in time only, the invention is not limited thereto. A series of temperature measurements may be performed or the first temperature $T_1$ and/or the reference temperature $T_R$ may be continuously measured and monitored and a temperature pattern may be obtained. This allows the determination of the change of flow rate over time.

Another example of the present disclosure may be applied if the flow in the pipeline 10 is at a constant flow rate and if the temperature of the fluid changes over time. The first temperature sensor 20 may be arranged at a first position 12 at the pipeline 10 and the reference temperature sensor 25 is arranged at a reference position at some known distance at the pipeline 10. If the fluid 13 inside the pipeline is cooled or heated before the reference temperature sensor 25, for example by a door which is opened towards a cold room the pipeline 10 becomes slightly cooled for a short time. Another example would be the switching on of a heating element attached to the pipeline 10 in front of the reference temperature sensor 25. The source of temperature change can either be random or forced by purpose by the measurement system. The reference temperature sensor 25 will then measure a change in the reference temperature $T_R$ at a reference time tr. The first temperature sensor 20 will also measure a change in the first temperature $T_1$ at a first time t1. If the distance between the first temperature sensor 20 and the reference temperature sensor 25 is known, the flow velocity can be calculated from the difference between tr and t1 and the corresponding flow rate can be derived. For example if the first temperature sensor 20 and the reference temperature sensor 25 are arranged at a distance of 8 m and a similar temperature change is measured 60 s later, the fluid flows at a velocity of 8 m/60 s. Multiplying this velocity with the cross sectional area of the pipe, for example 60 cm$^2$, the flow is 800 cm$^3$/s.

The above examples have been described with respect to temperature differences between a first temperature and a reference temperature. The present invention may also be applied to other parameters of the pipeline. For example the circumference and the diameter of the pipeline 10 change if the fluid flows through the pipeline 10. This change in dimension can be measured and compared to a reference value. The reference value may be measured when no flow is present in the pipeline 10 or may be measured at a model of the pipeline 10.

The present disclosure may be used with pipelines transporting fluids such as natural gas, oil or other similar liquids for energy companies, as well as other chemical products.

Knowledge of the type of the fluid 13 transported in the pipeline 10 may increase the accuracy of the flow rate measurement as further parameters such as viscosity, heat coefficient and others can be used in determining the flow rate.

Although the present disclosure has been described with respect to combustible fluids in pipelines it is obvious to a person skilled in the art that the present disclosure may applied to any fluid transported in any type of conduits. The present disclosure can be applied to any dimension of the conduit.

The invention claimed is:

1. A method for measuring a flow rate through a conduit, the method comprising:
   providing a reference temperature;

determining a first temperature using an infra-red sensor at a first position at the conduit;

determining a difference between the first temperature and the reference temperature; and determining the flow rate through the conduit based on the determined difference, wherein the measuring the first temperature from a distance to the first position.

2. The method of claim 1, wherein the providing the reference temperature comprises measuring the reference temperature at the first position, and wherein the first temperature is measured at a first time and the reference temperature is measured at a reference time.

3. The method of claim 1, wherein the providing the reference temperature comprises measuring the reference temperature at a reference position.

4. A method for measuring a flow rate through a conduit, the method comprising:

providing a reference temperature;

measuring a first temperature at a first position at the conduit;

determining a difference between the first temperature and the reference temperature; and determining the flow rate through the conduit based on the determined difference, wherein the measuring the first temperature from a distance to the first position;

wherein the providing the reference temperature comprises measuring the reference temperature at a reference position; and wherein the measuring the reference temperature comprises measuring one of a water temperature or a ground temperature as the reference temperature.

5. The method of claim 1, wherein measuring the first temperature comprises measuring a first temperature pattern.

6. The method of claim 1, further comprising measuring a second temperature at a second position.

7. The method of claim 1, wherein the conduit is a pipeline.

8. The method of claim 1, wherein the flow rate is the flow rate of a fluid or a gas flowing through the conduit.

9. An apparatus for measuring a flow rate through a conduit, the apparatus comprising:

a first sensor for measuring a first temperature at a first position of the conduit; and a calculation unit for determining a difference between the first temperature and a reference temperature and for determining the flow rate through the conduit based on the determined difference;

wherein the first sensor is an infra-red radiation sensor.

10. The apparatus of claim 9, further comprising a reference sensor for measuring the reference temperature.

11. The apparatus of claim 9, wherein the calculation unit and the first sensor are arranged at a distance with respect to each other.

12. The method of claim 3, wherein the measuring the reference temperature comprises measuring an environmental temperature.

13. The apparatus of claim 9, wherein the reference temperature is an environmental temperature.

14. The method of claim 3, wherein the measuring the reference temperature comprises measuring one of a water temperature or a ground temperature as the reference temperature.

* * * * *